United States Patent
Sobel et al.

(10) Patent No.: US 8,140,804 B1
(45) Date of Patent: Mar. 20, 2012

(54) SYSTEMS AND METHODS FOR DETERMINING WHETHER TO PERFORM A COMPUTING OPERATION THAT IS OPTIMIZED FOR A SPECIFIC STORAGE-DEVICE-TECHNOLOGY TYPE

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 660 days.

(21) Appl. No.: 12/337,132

(22) Filed: Dec. 17, 2008

(51) Int. Cl.
*G06F 3/00* (2006.01)
*G06F 12/00* (2006.01)

(52) U.S. Cl. .............................. 711/167; 710/8; 711/101

(58) Field of Classification Search .................. 711/154, 711/156, 101, 167; 710/8
See application file for complete search history.

(56) References Cited

U.S. PATENT DOCUMENTS

| | | | |
|---|---|---|---|
| 7,143,227 B2 * | 11/2006 | Maine | 710/306 |
| 2004/0177126 A1 * | 9/2004 | Maine | 709/217 |
| 2008/0120463 A1 * | 5/2008 | Ashmore | 711/114 |

OTHER PUBLICATIONS

Apacer and Diskeeper Corporation—The Best Gets Better; Diskeeper Corporation; Oct. 30, 2008.

* cited by examiner

*Primary Examiner* — Kevin Ellis
*Assistant Examiner* — Mehdi Namazi
(74) *Attorney, Agent, or Firm* — Advantedge Law Group (57) ABSTRACT

A computer-implemented method for determining whether to perform a computing operation that is optimized for a specific storage-device-technology type may comprise: 1) performing at least one proximate read operation by accessing a control location on a storage device and then accessing a test location on the storage device that is logically proximate to the control location, 2) performing at least one remote read operation by accessing a test location on the storage device that is logically remote from the control location, 3) determining, by comparing a length of time to access the proximate test location with a length of time to access the remote test location, a technology type of the storage device, and then 4) determining, based on the technology type of the storage device, whether to perform the computing operation. Corresponding systems and computer-readable media are also disclosed.

20 Claims, 7 Drawing Sheets

SYSTEMS AND METHODS FOR DETERMINING WHETHER TO PERFORM A COMPUTING OPERATION THAT IS OPTIMIZED FOR A SPECIFIC STORAGE-DEVICE-TECHNOLOGY TYPE

BACKGROUND OF THE INVENTION

Computing systems use a wide variety of storage devices, including mechanical hard drives, solid state drives, and other technologies. In some cases, computing system utilities, such as defragmenters, system-startup-time enhancers, and secure-deletion applications, may be optimized for a specific type of storage device. For example, a traditional defragmenter may be optimized for a mechanical hard drive.

Executing a utility that is not optimized or designed for the particular storage device type in use may result in poor performance or a decrease in the lifespan of the storage device. For example, such negative results may occur if a computing system executes a traditional defragment utility on a solid state drive. As such, the instant disclosure discloses a method for determining the type of storage device in a computing system and subsequently determining, based on the storage device type, whether to execute certain utilities.

BRIEF SUMMARY OF INVENTION

As will be described in greater detail below, the instant disclosure generally relates to systems and methods for determining the technology type of a storage device and then determining, based on the technology type of the storage device, whether to perform a computing operation that is optimized for a specific type of storage-device technology, such as a defragment operation optimized for a mechanical hard drive.

In one example, a computing system may determine the technology type of a storage device by timing reads of multiple separate test locations on the storage device and then comparing the test location read times. For example, the computing system may: 1) read data from a control location on a storage device, 2) read data from a test location on the storage device that is identical or logically proximate to the control location, and then 3) read data from a test location on the storage device that is logically remote from the control location. The control location may represent a location at the logical start of the device, a location at the logical end of the device, or a random location on the device.

The system may then determine, by comparing how long it took for the storage device to read data from the proximate test location with how long it took for the storage device to read data from the remote test location, whether the storage device is a mechanical hard drive or solid state drive. In this example, the system may determine that the storage device is a mechanical hard drive if the test location read times are not substantially identical. Conversely, the system may determine that the storage device is a solid state drive if the test location read times are substantially identical. The computing system may then determine, based on whether the storage device is a mechanical hard drive or a solid state drive, whether to perform a specific utility or operation, such as a defragment operation optimized for a mechanical hard drive or a secure-deletion utility optimized for a solid state drive.

In one example, the system may perform a plurality of proximate read operations (each of which may consist of, for example, reading the control location and then reading a proximate test location) and a plurality of remote read operations (each of which may consist of reading a remote test location) in order to increase the statistical likelihood that the system has correctly determined the technology type of the storage device based on the variance of read times for test locations. In some examples, each remote read operation may also comprise re-reading the control location immediately before reading the remote test location. For example, upon performing a proximate react operation (by, for example, reading a control location and then reading a proximate test location), the system may perform a remote read operation by re-reading the control location and then reading a remote test location.

In some embodiments the system may, prior to reading data from the storage device, disable access-optimization functionality (such as read or write caching) on the storage device in order to avoid falsely low access times.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for determining the technology type of a storage device and then determining, based on the technology type of the storage device, whether to perform a computing operation that is optimized for a specific type of storage-device technology, such as a defragment operation optimized for a mechanical hard drive. As used herein, the phrase "technology type" may refer to the technology upon which a storage device is based. Examples of technology types may include, but are not limited to, mechanical hard drives, solid state drives, magnetic tape drives, optical drives, flash drives, or any other suitable technology. "Mechanical hard drive," as used herein, may refer to a storage device that stores digitally encoded data on rapidly rotating platters with magnetic surfaces. "Solid state drive," as used herein, may refer to a storage device that uses solid state memory to store data.

Figure 1:
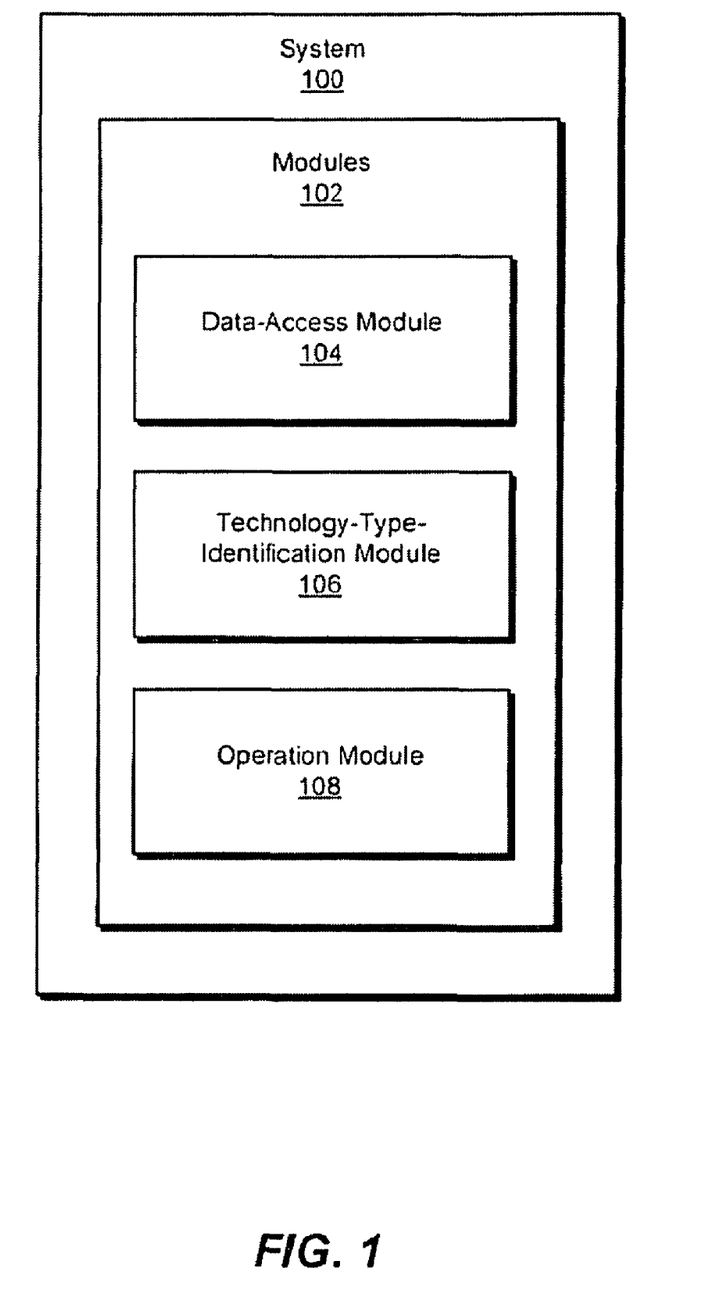
FIG. 1 is a block diagram of an exemplary system for determining whether to perform a computing operation that is optimized for a specific storage-device-technology type.
Figure 2:
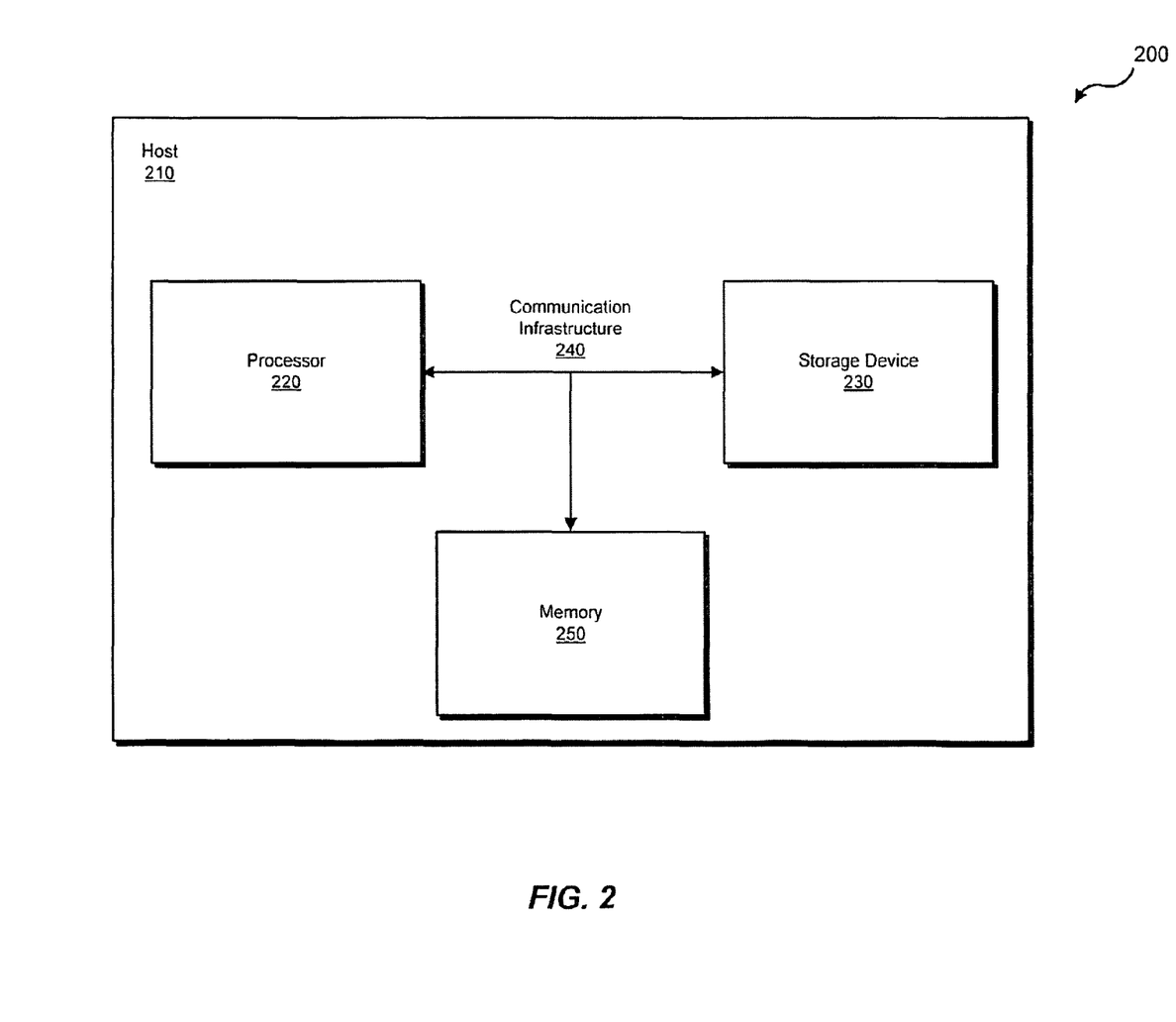
FIG. 2 is a block diagram of an exemplary system for determining whether to perform a computing operation that is optimized for a specific storage-device-technology type according to an additional embodiment.

The following will provide, with reference to FIGS. 1 and 2, detailed descriptions of exemplary systems for determining the technology type of a storage device and then determining, based on the technology type of the storage device, whether to perform a computing operation that is optimized for a specific type of storage-device technology. A detailed description of a corresponding computer-implemented method will be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for determining the technology type of a storage device and then determining, based on the technology type of the storage device, whether to perform a computing operation that is optimized for a specific type of storage-device technology. As illustrated in this figure, exemplary system 100 may comprise one or more modules 102 for performing one or more tasks. For example, as will he explained in greater detail below, exemplary system 100 may comprise a data-access module 104 for selecting and accessing both a control location and one or more test locations on a storage device.

Exemplary system 100 may also comprise a technology-type-identification module 106 for determining, by comparing lengths of time to access various test locations (i.e., by comparing how long it takes for the storage device to read and return data from various test locations), the technology type of the storage device. Exemplary system 100 may further comprise an operation module 108 for determining, based on the technology type of the storage device, whether to perform a computing operation, such as a defragment operation optimized for a mechanical hard drive or a secure-deletion utility optimized for a solid state drive. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules configured to run on one or more computing devices, such as the devices illustrated in FIG. 2 (e.g., host 210), computing system 610 in FIG. 6, and/or portions of exemplary network architecture 700 in FIG. 7. One or more of modules 102 in FIG. 1 may also represent all or portions of one or more special-purpose computers configured to perform one or more tasks.

FIG. 2 is a block diagram of an exemplary system 200 for determining the technology type of a storage device and then determining, based on the technology type of the storage device, whether to perform a computing operation that is optimized for a specific type of storage-device technology. Host 210 in FIG. 2 may represent any type or form of computing device capable of executing computer-readable instructions. Examples of host 210 include, without limitation, a desktop computer, a laptop computer, a workstation, a personal digital assistant, a cellular telephone, exemplary computing system 610 in FIG. 6, or any other suitable computing device.

In its simplest form, host 210 may comprise a processor 220, a storage device 230, a communication infrastructure 240, and memory 250. Processor 220 generally represents any type or form of processing unit capable of processing data or interpreting and executing instructions. Storage device 230 may represent any type of rewritable storage medium, such as a hard drive, solid state drive, flash memory, compact disk, DVD, magnetic tape, or any other suitable storage medium.

Communication infrastructure 240 generally represents any type or form of infrastructure capable of facilitating communication between one or more components of a computing device. Examples of communication infrastructure 240 include, without limitation, a communication bus, such as an ISA, PCI, PCIc, or similar bus. Memory 250 generally represents any type or form of last-access storage device capable of storing data and/or other computer-readable instructions. Examples of memory 250 include, without limitation, random access memory (RAM), read only memory (ROM), flash memory, or any other suitable memory device.

Figure 3:
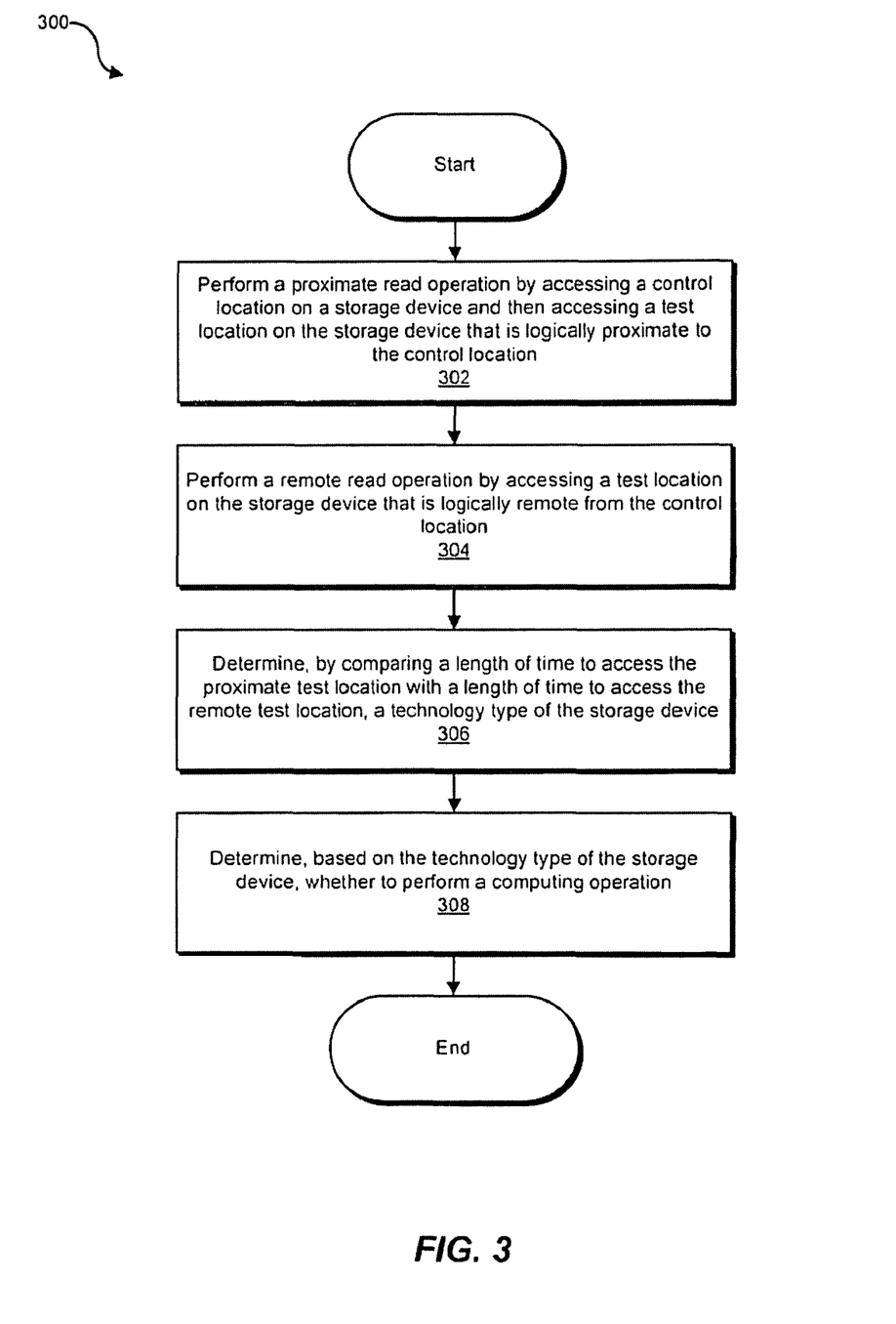
FIG. 3 is a flow diagram of an exemplary computer-implemented method for determining whether to perform a computing operation that is optimized for a specific storage-device-technology type.

FIG. 3 is a flow diagram of an exemplary computer-implemented method 300 for determining the technology type of a storage device and then determining, based on the technology type of the storage device, whether to perform a computing operation that is optimized for a specific type of storage-device technology. As illustrated in FIG. 3, at step 302 the system may perform at least one proximate read operation on a storage device. For example, as illustrated in FIG. 2, host 210 (which may, as detailed above, comprise data-access module 104 in FIG. 1) may perform a proximate read operation on storage device 230.

In one example, and as will be described in greater detail below, the system may perform a proximate read operation by: 1) accessing a control location on the storage device and then 2) accessing a test location on the storage device that is logically proximate to the control location. The system may access locations, such as the control location and the proximate test location, in a variety of ways. In one embodiment, the system may access a location by reading the location. For example, host 210 may access a control location by commanding storage device 230 to retrieve and return the contents of the control location.

A "location" may refer to an address that uniquely identifies a sector on a storage device. A "sector" may represent a unique fixed-size segment of a storage device, such as the smallest accessible amount of data on the storage device. For example, a sector on a storage device may comprise 512 bytes of data. On such a storage device, data may be accessed in multiples of 512 bytes only. Storage device locations may be addressed using a variety of addressing schemes, including, without limitation, Cylinder-Head-Sector (CHS) addressing, pseudo CHS addressing, Logical-Block Addressing (LBA), or any other suitable scheme for addressing a location on a storage device.

As will be described in greater detail below, a "control location" may refer to any location on a storage device that the system may access at least once in order to accurately compare access times (i.e., the length of time required to retrieve and return data from a location) for subsequent test locations.

In one embodiment, the control location may represent the lowest logical location on the storage device. For example, host 210 may select and access the lowest logical location on storage device 230.

A "logical location" may refer to an address or value in an addressing scheme that may or may not have a direct physical relationship to the underlying structure or technology of the storage device. For example, a solid state drive may be configured to address data using the legacy CHS addressing scheme, even though the solid state drive does not possess any physical cylinders or heads. For example, host 210 in FIG. 2 may refer to a location on storage device 230 using CHS address cylinder 2, head 0, sector 1, represented as (2, 0, 1), even if storage device 230 is a solid state drive that does not possess any physical cylinders or heads. Similarly, a mechanical hard drive may address data using the LISA scheme, even though the mechanical drive possesses physical cylinders, heads, and sectors. For example, host 210 in FIG. 2 may refer to cylinder 1, head 0, sector 1 on mechanical hard drive 500 in FIG. 5 as logical location 16 (element 516 in FIG. 5).

In some cases, a CHS address may have a direct physical relationship to the data stored on a storage device. For example, on older mechanical hard drives, the CHS address (0, 0, 32) may in fact correspond to cylinder 0, head 0, sector 32 on the mechanical drive. In other examples, however, due to the varying number of sectors per track on the platters of many modern mechanical hard drives, a CHS address may not correspond directly to the physical geometry of a mechanical drive.

The lowest logical location on a storage device may represent the location with the lowest, or first, address identifier, as determined by the addressing scheme that the system uses. In CHS addressing, the lowest logical location on a storage device may be (0, 0, 1). In LBA schemes, because the scheme addresses locations with a single sequential value, the lowest logical location on a storage device may be location 0.

Figure 4:
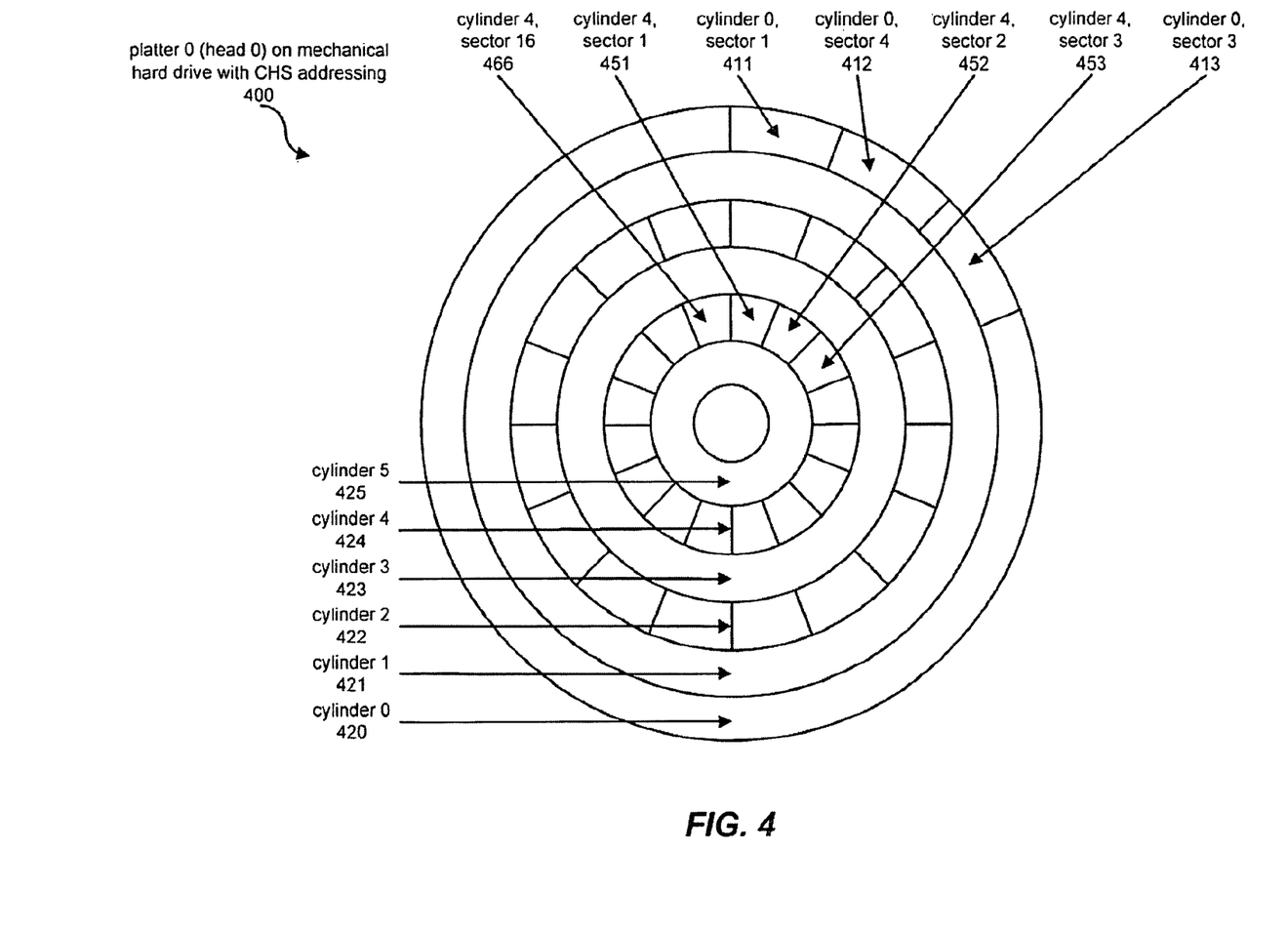
FIG. 4 illustrates an exemplary mechanical hard drive with Cylinder-Head-Sector (CHS) addressing.
Figure 5:
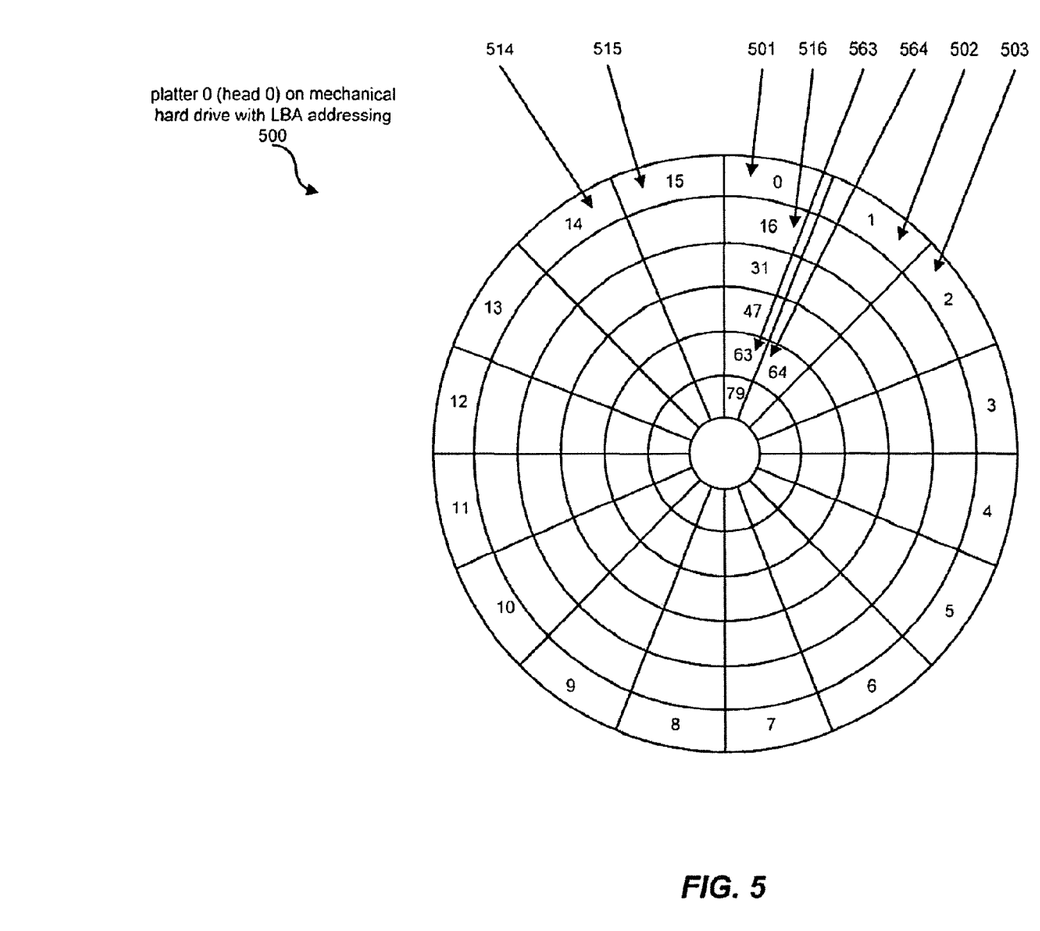
FIG. 5 illustrates an exemplary mechanical hard drive with Logical-Block Addressing (LBA).

In one example, host 210 may use CHS addressing. In this example, host 210 may determine that the lowest logical location on storage device 230 is location (0, 0, 1). Element 411 in FIG. 4 represents the lowest logical location on a mechanical hard drive 400 that employs CHS addressing. In another example, host 210 may use LBA. In this example, host 210 may determine that the lowest logical location on storage device 230 is location 0. Element 501 in FIG. 5 represents the lowest logical location on a mechanical hard drive 500 that employs LBA.

In an alternate embodiment, the control location accessed as part of the proximate read operation in step 302 may represent the highest logical location on the storage device. In another embodiment, the control location may represent a random location on the storage device. For example, host 210 in FIG. 2 may select and designate a random location on storage device 230 as a control location. Host 210 may select a random control location in a variety of ways, including, for example, through the use of any of the numerous well-known random number generation techniques.

For example, in the case where host 210 uses a CHS addressing scheme, host 210 may select a random location on storage device 230 by: 1) generating a random cylinder number that falls within a range of valid cylinder values, 2) generating a random head number that falls within a range of valid head values, and 3) generating a random sector number that falls within a range of valid sector values. For example, host 210 may use CHS addressing with cylinder values of 0-16383, head values of 0-7, and sector values of 1-256. In this example, host 210 may randomly select a control location on storage device 230 by generating a random cylinder value that falls within the range of 0-16383, generating a random head value that falls within the range of 0-7, and generating a random sector value that falls within the range of 1-256.

Conversely, in the example where host 210 uses an LBA scheme, host 210 may select a random control location by generating a random number that falls within a range of all locations on the storage device. For example, host 210 may use a LBA scheme with valid addresses of $0\text{-}2^{22}$. In this example, host 210 may select a random control location by generating a random value that falls within the range of $0\text{-}2^{22}$.

Upon accessing the control location, the system may complete the proximate read operation in step 302 by accessing a test location on the storage device that is logically proximate to the control location. The phrase "logically proximate," as used herein, may refer to a logical address that is adjacent, substantially adjacent, or otherwise within close logical proximity to another logical address, as determined either by the system or by predetermined criteria. For example, the CI-IS address (0, 0, 1) may be logically proximate to the CHS addresses (0, 0, 2) and (0, 0, 8). Similarly, in LBA schemes, logical location 0 may be logically proximate to logical locations 1-64.

In situations where the control location represents the lowest logical location on the storage device, then the proximate test location may represent a test location that is logically proximate to the lowest logical location-on the storage device. For example, if, in the example illustrated in FIG. 4, the system accesses CHS address (0, 0, 1) (element 411 in FIG. 4) as the control location, then the system may access either CHS address (0, 0, 2) or (0, 0, 3) (elements 412 and 412 in FIG. 4, respectively) as the proximate test location. Similarly, if, in the example illustrated in FIG. 5, the system accesses logical location 0 (element 501 in FIG. 5) as the control location, then the system may access either logical location 1 (element 502 in FIG. 5) or logical location 2 (element 503 in FIG. 5) as the proximate test location.

Alternatively, in situations where the control location represents a random logical location on the storage device, then the proximate test location may represent a test location that is logically proximate to this random control location. For example, if, in the example illustrated in FIG. 4, the system accesses CHS address (4, 0, 2) (element 452 in FIG. 4) as the control location, then the system may access CHS address (4, 0, 1) or (4, 0, 3) (elements 451 and 453 in FIG. 4, respectively) as the proximate test location. Similarly, if, in the example illustrated in FIG. 5, the system accesses logical location 63 (element 563 in FIG. 5) as the control location, then the system may access logical location 64 (element 564 in FIG. 5) as the proximate test location.

In certain examples, the proximate test location may be distinct from the control location. For example, if host 210 employs a CHS addressing scheme, host 210 may access a control location of (0, 0, 1) and a proximate test location of (0, 0, 2). In other examples, however, the proximate test location may be the same as the control location. For example, is host 210 employs a CHS addressing scheme, host 210 may access a control location of (0, 0, 1) and a proximate test location of (0, 0, 1).

Accessing a test location that is identical to the control location may ensure that mechanical head movement in a mechanical hard drive will not occur when re-accessing the control location since, in the case of a mechanical hard drive, the head will already be positioned over the control location before re-accessing the control location. Because the head does not need to move when re-accessing the control location, the time to re-access the control location may consist exclusively of: 1) the time necessary to rotate the platter and 2) the time that is necessary to transmit a command and receive a response from the storage device.

Returning to FIG. 3, at step 304 the system may perform at least one remote read operation on the storage device. For example, as illustrated in FIG. 2, host 210 (which may, as detailed above, comprise data-access module 104 in FIG. 1) may perform a remote read operation on storage device 230.

In one example, the system may perform a remote read operation by accessing a test location on the storage device that is logically remote from the control location. The phrase "logically remote," as used herein, refers to a logical address that is not adjacent, substantially adjacent, or otherwise within close logical proximity to another logical address. For example, the CHS address (0, 0, 1) may be logically remote from the CHS address (399, 254, 63). Similarly, in LBA schemes, logical location 0 may be logically remote from logical location 645,012. In one example, the remote test location may be different from both the control location and the proximate test location.

In situations where the control location represents the lowest logical location on the storage device, then the system may access a test location that is logically remote from the lowest logical location on the storage device. For example, if, in the example illustrated in FIG. 4, the system accesses CHS address (0, 0, 1) (element 411 in FIG. 4) as the control location, then the system may access CHS address (4, 0, 3) (element 453 FIG. 4) as the remote test location. Similarly, if, in the example illustrated in FIG. 5, the system accesses logical location 0 (element 501 in FIG. 5) as the control location, then the system may access logical location 64 (element 564 in FIG. 5) as the remote test location.

Alternatively, in situations where the control location represents a random logical location on the storage device, then the remote test location may represent a test location that is logically remote from this random control location. For example, if, in the example illustrated in FIG. 4, the system accesses CHS address (4, 0, 2) (element 452 in FIG. 4) as the control location, then the system may access CHS address (0, 0, 4) (element 412 in FIG. 4) as the remote test location. Similarly, if, in the example illustrated in FIG. 5, the system accesses logical location 63 (element 563 in FIG. 5) as the control location, then the system may access logical location (element 502 in FIG. 5) as the remote test location.

In an additional example of step 304, the remote read operation may comprise re-accessing the control location immediately before accessing the remote test location. For example, upon performing the proximate read operation in step 302 (by, for example, accessing a control location and then accessing a proximate test location), the system may perform a remote read operation by re-accessing the control location and then accessing a remote test location. As will be described in greater detail below, re-accessing the control location immediately prior to accessing the remote test location may ensure that, in cases where the storage device is a mechanical hard drive, the head of the drive is returned to and positioned over the control location prior to accessing the remote location.

Returning to FIG. 3, at step 306 the system may determine, by comparing a length of time to access the proximate test location with a length of time to access the remote test location, the technology type of the storage device. For example, host 210 in FIG. 2 (which may, as detailed above, comprise technology-type-identification module 106) may determine whether storage device 230 is a mechanical hard drive or solid state drive by comparing how long it took for storage device 230 to retrieve and return the contents of the proximate test location with how long it took for storage device 230 to retrieve and return the contents of the remote test location.

The system may employ any of a variety of well known timing techniques to determine how long it takes for a storage device to access a test location (also known as "access time"). For example, host 210 may determine that an access time for a test location is the difference between system clock times before and after accessing the test location. For mechanical hard drives, access time may be defined as follows:

Access Time=Command Overhead Time+Seek Time+
Rotational Latency+Transfer Time           1.1

In the above equation, "seek time" generally refers to the time it takes for the head of a mechanical hard drive to move from one track to another. In order to read from a particular location on a mechanical hard drive, the read/write head of the drive needs to be physically moved to the correct place. This process is known as seeking, and the time it takes for the head to move to the desired location is known as seek time. Seek time for a given drive varies depending on how far the head's destination is from its origin at the time of each read or write instruction. "Command-overhead time" may refer to the processing time required by a storage device and its controller to process a command, such as a command to read data from a location on the storage device. "Rotational latency" or "rotational delay" may refer to the amount of time it takes for a storage device to rotate a desired sector on a platter under the drive's head. "Transfer time" may refer to the time during which data is actually read or written, with a certain throughput.

In contrast to mechanical drives, access time for solid state drives may be defined as follows:

Access Time=Command Overhead Time+Transfer
Time           1.2

Because the seek time and rotational latency for every read operation on a mechanical hard drive depends greatly on the initial position of the drive's head and platter, access times on a mechanical hard drive may, at least on average, vary substantially since the mechanical hard drive may be required to move its heads and/or rotate its platters to access different physical locations on the drive. Conversely, because a solid state drive does not possess any physical moving parts (such as heads and rotating platters), access times on a solid state drive may, at least on average, be substantially constant.

In one embodiment, the system may determine that a storage device is a mechanical hard drive by determining that the access times for the proximate test location and the remote test location are not substantially identical. For example, host 210 in FIG. 2 (which may, as detailed above, comprise technology-type-identification module 106) may determine that storage device 230 is a mechanical hard drive if it took storage device 230 substantially longer to retrieve and return the contents of the remote test location than it took for storage device 230 to retrieve and return the contents of the proximate test location. In this example, the substantially different access times may be due to seek and rotational delays introduced when the mechanical hard drive moved its head and/or rotated its platters to access the different test locations on the drive.

For example, prior to performing the proximate read operation in step 302 in FIG. 3, the head of mechanical hard drive 400 in FIG. 4 may be positioned over location 453. At step 302, data-access module 104 in FIG. 1 may direct hard drive 400 to access its lowest logical location (in this case, location 411) as a control location. To access location 411, hard drive 400 may move its head from cylinder 424 to cylinder 420.

Once the head is positioned over cylinder 420, hard drive 400 may rotate platter 0 so that the head of the drive is positioned over location 411. Data-access module 104 may then direct hard drive 400 to access location 413 as a proximate test location. To access location 413, hard drive 400 may rotate platter 0 so that the head of the drive is positioned over location 413.

At step 304 in FIG. 3, data-access module 104 in FIG. 1 may direct hard drive 400 to access location 466 as a remote test location. To access location 466, hard drive 400 may move its head from cylinder 420 to cylinder 424. Once the head is positioned over cylinder 424, hard drive 400 may rotate platter 0 so that the head of the drive is positioned over location 466.

In this example, at step 306 in FIG. 3 technology-type-identification module 106 in FIG. 1 may determine that the access time for the proximate test location (location 413) was 5.479 milliseconds (ms), while the access time for the remote location (location 466) was 13.237 ms. Technology-type-identification module 106 may then determine that the access time for the proximate test location was substantially less than the access time for the remote test location due to seek-time and/or rotational delays introduced by a mechanical hard drive. In this example, technology-type-identification module 106 may determine that hard drive 400 is a mechanical hard drive.

In an alternate embodiment, the system may determine that a storage device is a solid state drive by determining that the access times for the proximate test location and the remote test location are substantially identical. For example, host 210 in FIG. 2 (which may, as detailed above, comprise technology-type-identification module 106) may determine that storage device 230 is a solid state drive if it took storage device 230 substantially the same amount of time to retrieve and return the contents of both the remote and proximate test locations.

The system may implement the "substantially identical" standard in a variety of ways. In one embodiment, the system may determine that access times for test locations are substantially identical if the delta for the access times falls within a predefined range, such as 1 ms. For example, technology-type-identification module 106 may determine that the access times 5.479 ms and 6.477 ms are substantially identical since the delta for these access times falls within the predefined 1 ms range. Conversely, technology-type-identification module 106 may determine that the access times 5.479 its and 9.477 ms are not substantially identical since the delta for these access times fall outside of the predefined 1 ms range. In another embodiment, the system may employ one of many well-known statistical techniques to determine whether the access times are substantially identical.

Returning to FIG. 3, at step 308 the system may determine, based on the technology type of the storage device, whether to perform a computing operation that is optimized for a specific storage-device-technology type. For example, host 210 may determine, based on whether storage device 230 is a mechanical hard drive or a solid state drive, to perform a computing operation that is optimized for a mechanical hard drive. Examples of computing operations include, but are not limited to, defragment utilities, system-startup-time enhancers, secure-deletion utilities, or any other operation which may be optimized for various storage device technologies.

For example, if host 210 in FIG. 2 determines that storage device 230 is a mechanical hard drive, then host 210 may perform a defragment operation on storage device 230 that is optimized for a mechanical hard drive. Similarly, if host 210 in FIG. 2 determines that storage device 230 is a solid state drive, then host 210 may perform a system-startup-enhancer operation on storage device 230 that is optimized for a solid state drive. Upon completion of step 308, the process flow of exemplary method 300 in FIG. 3 may terminate.

As detailed above, logical locations may or may not have a direct physical relationship to the underlying structure or technology of the storage device. For example, while a test location may be logically proximate to a control location, this same test location may not in fact be physically proximate to the control location. As such, in certain embodiments exemplary method 300 in FIG. 3 may comprise performing a plurality of proximate and remote read operations in order to more accurately determine whether differences in access times for proximate and remote test locations are due to mechanical delays.

In one embodiment, each proximate read operation may comprise: 1) accessing the control location and then 2) accessing a proximate test location that is distinct from all other proximate test locations that have been accessed. Similarly, each remote read operation may comprise accessing a remote test location that is distinct from all other remote test locations that have been accessed. As detailed above, these remote read operations may also comprise re-accessing the control location immediately prior to accessing the remote test location.

The number of proximate and remote read operations that the system performs in this embodiment may be pre-determined or dynamically determined. In general, a higher number of read operations may result in a higher statistical confidence that the system has correctly determined the technology type of the storage device based on the variance of access times for test locations. For example, storage device 230 in FIG. 2 may be a mechanical hard drive and host 210 may select proximate and remote test locations on storage device 230. Because a mechanical hard drive must move mechanical parts to access these locations, it is unlikely that accessing the proximate and remote test locations will result in identical or substantially identical access times. However, as the number of read operations increases, the statistical probability of identical or substantially identical access times for the proximate and remote test locations may decrease.

In one example, the number of read operations that the system performs may be predetermined based on experimentation or through cost-benefit analyses, which may involve comparing the time cost of performing read operations against the increased statistical likelihood of accurate results. In an additional example, the system may dynamically determine the number of read operations required for a statistically accurate result. For example, the system may determine that only two read operations (i.e., one proximate read operation and one remote read operation) are necessary if the access times for the proximate and remote test locations are substantially different. In an additional example, the system may dynamically determine that additional read operations are required if the access times for the proximate and remote test locations are substantially identical. The system may also make similar dynamic determinations with three or more read operations.

If the system decides to perform a plurality of proximate and remote read operations, the system may determine the technology type of the storage device in step 306 in FIG. 3 by: 1) calculating an average access time for the proximate test locations, 2) calculating an average access time for the remote test locations, and then 3) comparing the average access time for the proximate test locations with the average access time for the remote test locations. If the average access times are substantially identical, then the system may determine that the storage device is a solid state drive. Conversely, if the average access times are not substantially identical, then the system may determine that the storage device is a mechanical hard drive.

Although not illustrated in FIG. 3, in some embodiments the system may, prior to performing step 302, disable access-optimization functionality on the storage device. For one example, host 210 may disable read and/or write caching on storage device 230.

Access-optimization functionality may comprise any functionality by which the storage device may respond to a command to access a location on the storage device without accessing the actual location. Examples of access-optimization functionality include, but are not limited to, read caching and write caching. Read caching may result in falsely low access times because the storage device may retrieve the contents of a requested location from a fast cache instead of the actual location on the storage device. Write caching may result in falsely low access times because the storage device may write the value of a requested location to a fast write cache instead of the actual location on the storage device.

Although the various steps of exemplary method 300 in FIG. 3 have been described with a particular degree of specificity, various modifications to this method are possible. For example, steps 302 and 304 may only be performed when there is no direct means of querying the storage device to determine the technology type of the device. For example, a device manager or inventory setting may indicate whether a storage device is a solid state storage device using, for example, an SSD flag set to TRUE or FALSE. In this example, exemplary method 300 in FIG. 3 may simply comprise: 1) directly querying the storage device (or a device manager associated with the storage device) to determine the technology type of the storage device and then 2) determining, based on the technology type of the storage device, whether to perform a computing operation that is optimized for a specific storage-device-technology type.

The systems and methods disclosed herein may be implemented in a variety of ways and provide a number of advantages. For example, by determining the technology type of a storage device, a system may select optimization techniques that are suited for a particular storage device technology. Customized storage device optimization techniques may save time for a user and may even prolong the lifetime of the storage device. For example, an optimization utility executed on a mechanical hard drive may increase the drive's read and write times. Additionally, because current solid state technology is limited to a finite number of writes for each location on the drive, an optimization utility executed on a solid state drive may improve the drive's lifetime by uniformly distributing writes. Optimization techniques may also prolong the lifetime of the moving parts of a mechanical drive by reducing movement of the parts, such as the moving mechanical head.

Figure 6:
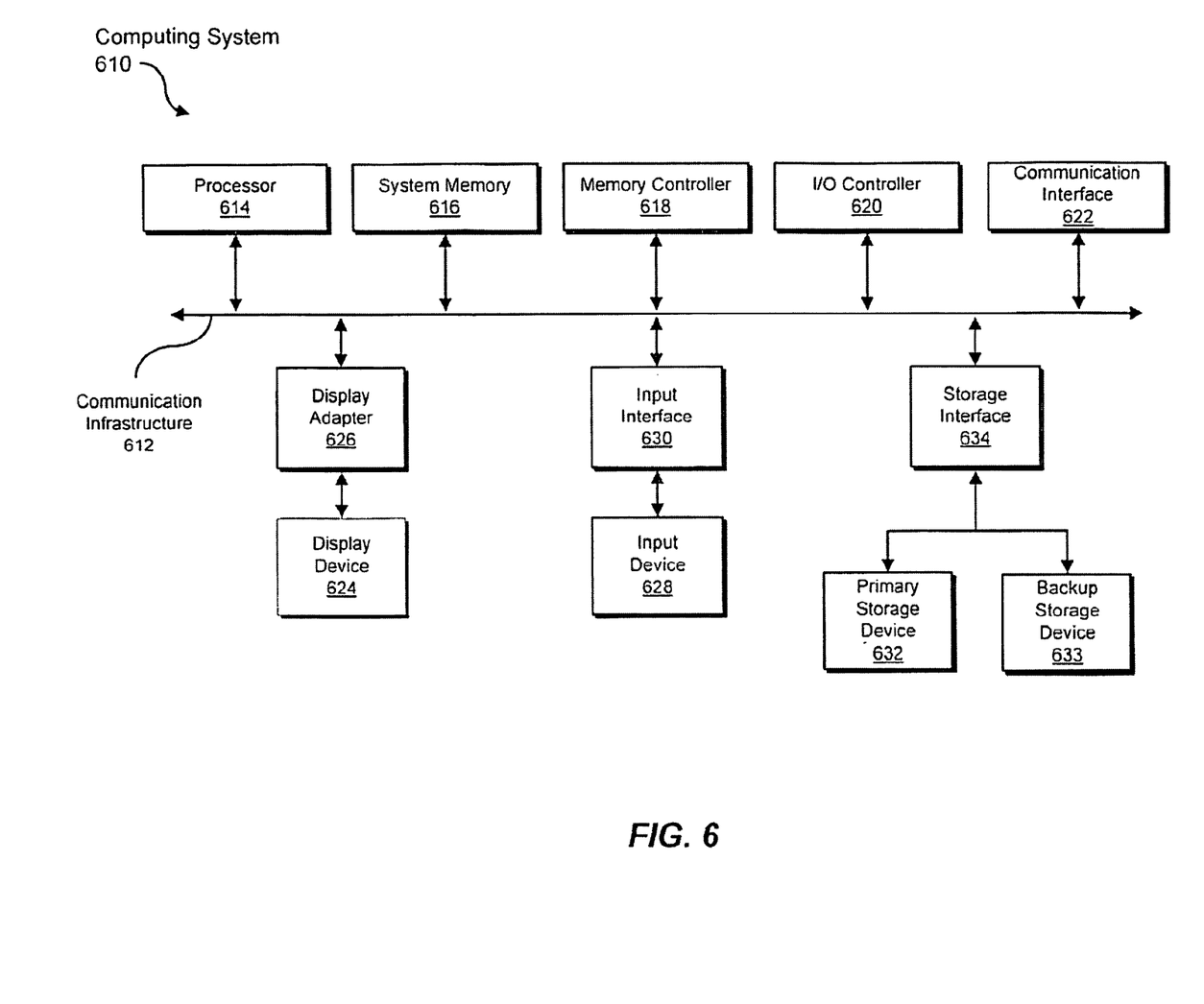
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the selecting, determining, accessing, disabling, and reading steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as performing, accessing, determining, comparing, disabling, reading, and/or calculating.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the performing, accessing, determining, comparing, disabling, reading, and/or calculating steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interlace 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the performing, accessing, determining, comparing, disabling, reading, and/or calculating steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the performing, accessing, determining, comparing, disabling, reading, and/or calculating steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the performing, accessing, determining, comparing, disabling, reading, and/or calculating steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
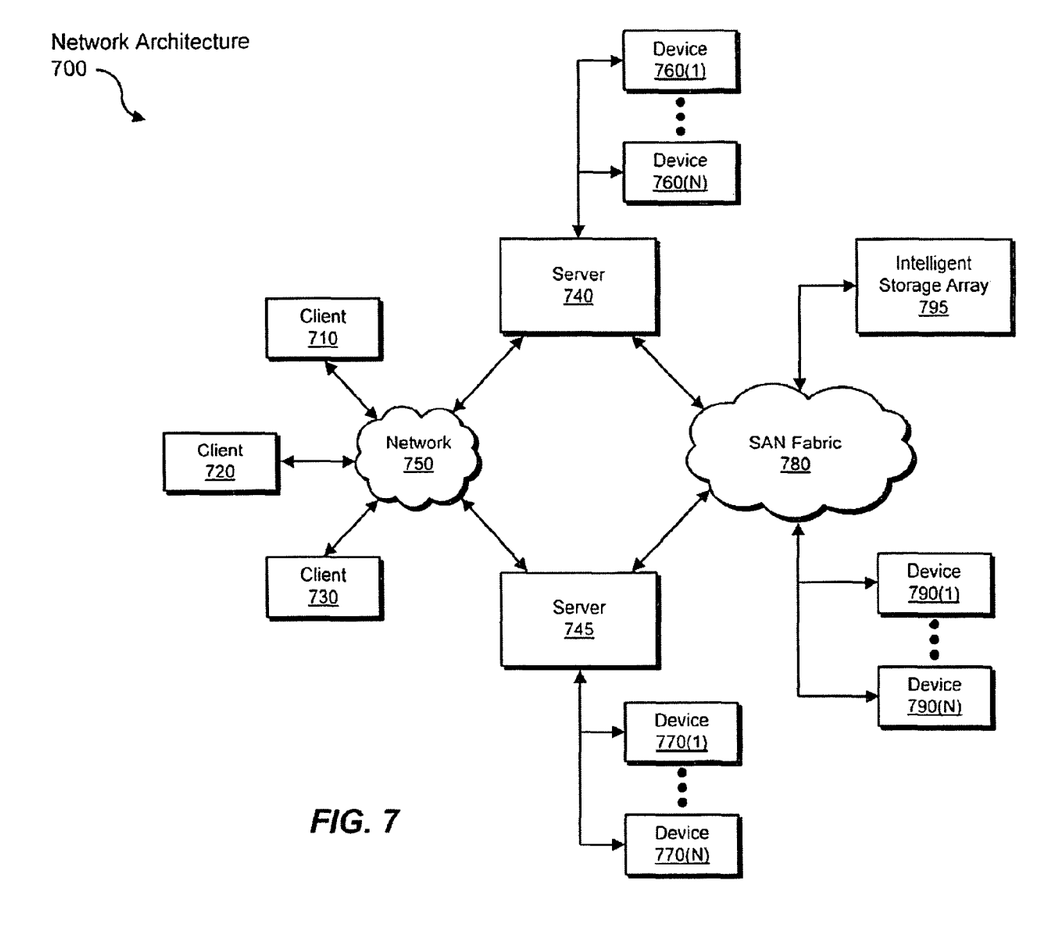
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7 one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS. SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using; for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the performing, accessing, determining, comparing, disabling, reading, and/or calculating steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for performing, either alone or in combination with other elements, one or more steps of an exemplary method for determining whether to perform a computing operation that is optimized for a specific storage-device-technology type. Such a method may comprise: 1) performing at least one proximate read operation by accessing a control location on a storage device and then accessing a test location on the storage device that is logically proximate to the control location, 2) performing at least one remote read operation by accessing a test location on the storage device that is logically remote from the control location, 3) determining, by comparing a length of time to access the proximate test location with a length of time to access the remote test location, a technology type of the storage device, and then 4) determining, based on the technology type of the storage device, whether to perform the computing operation. In one example, the remote read operation may further comprise accessing the control location prior to accessing the remote test location.

The control location may represent the lowest logical location on the storage device or a random location on the storage device. In some examples, the proximate test location may be identical to the control location. In other examples, the proximate test location may be distinct from both the control location and the remote test location. The computing operation may represent a defragment operation, a system-startup-time enhancer, a secure-deletion utility, or any other computing operation that has been optimized for a specific storage-device-technology type.

In one example, the method may further comprise disabling access-optimization functionality, such as caching, on the storage device. In addition, the system may access the control location, proximate location, and remote location by reading data from each location.

In some embodiments, performing the proximate read operation may comprise performing a plurality of proximate read operations and performing the remote read operation may comprise, performing a plurality of remote read operations. In this example, the system may determine the technology type of the storage device by: 1) calculating an average length of time to access each proximate test location, 2) calculating an average length of time to access each remote test location, 3) and then comparing the average length of time to access each proximate test location with the average length of time to access each remote test location.

In some examples, determining the technology type of the storage device may comprise: 1) determining that the length of time to access the proximate test location is not substantially identical to the length of time to access the remote test location and then 2) determining that the storage device is a mechanical hard drive. Alternatively, determining the technology type of the storage device may comprise: 1) determining that the length of time to access the proximate test location is substantially identical to the length of time to access the remote test location and then 2) determining that the storage device is a solid state drive.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining whether to perform a computing operation that is optimized for a specific storage-device-technology type, the method comprising:
   performing at least one proximate read operation, the proximate read operation comprising:
      accessing a control location on a storage device;
      accessing a test location on the storage device that is logically proximate to the control location;
   performing at least one remote read operation, the remote read operation comprising accessing a test location on the storage device that is logically remote from the control location;
   determining, by comparing a length of time to access the proximate test location with a length of time to access the remote test location, a technology type of the storage device;
   determining, based on the technology type of the storage device, whether to perform the computing operation.

2. The method of claim 1, wherein the remote read operation further comprises accessing the control location prior to accessing the remote test location.

3. The method of claim 1, wherein the proximate test location is identical to the control location.

4. The method of claim 1, wherein the proximate test location is distinct from both the control location and the remote test location.

5. The method of claim 1, further comprising disabling access-optimization functionality on the storage device.

6. The method of claim 5, wherein the disabling access-optimization functionality comprises disabling caching.

7. The method of claim 1, wherein the control location comprises:
   a lowest logical location on the storage device;
   a random location on the storage device.

8. The method of claim 1, wherein:
   accessing the control location comprises reading data from the control location;
   accessing the proximate test location comprises reading data from the proximate test location;
   accessing the remote test location comprises reading data from the remote test location.

9. The method of claim 1, wherein:
   performing the proximate read operation comprises performing a plurality of proximate read operations;
   performing the remote read operation comprises performing a plurality of remote read operations.

10. The method of claim 9, wherein determining the technology type of the storage device comprises:
    calculating an average length of time to access the proximate test locations;
    calculating an average length of time to access the remote test locations;
    comparing the average length of time to access the proximate test locations with the average length of time to access the remote test locations.

11. The method of claim 1, wherein determining the technology type of the storage device comprises:
    determining that the length of time to access the proximate test location is not identical to the length of time to access the remote test location;
    determining that the storage device is a mechanical hard drive.

12. The method of claim 1, wherein determining the technology type of the storage device comprises:
    determining that the length of time to access the proximate test location is identical to the length of time to access the remote test location;
    determining that the storage device is a solid state drive.

13. The method of claim 1, wherein the computing operation comprises at least one of:
    a defragment operation;
    a system-startup-time enhancer;
    a secure-deletion utility.

14. A system for determining whether to perform a computing operation that is optimized for a specific storage-device-technology type, the system comprising:
    a data-access module programmed to:
       perform at least one proximate read operation, the proximate read operation comprising:

accessing a control location on a storage device;
accessing a test location on the storage device that is logically proximate to the control location;
perform at least one remote read operation, the remote read operation comprising accessing a test location on the storage device that is logically remote from the control location;
a technology-type-identification module programmed to determine, by comparing a length of time to access the proximate test location with a length of time to access the remote test location, a technology type of the storage device;
an operation module programmed to determine, based on the technology type of the storage device, whether to perform the computing operation.

15. The system of claim 14, wherein the remote read operation further comprises accessing the control location prior to accessing the remote test location.

16. The system of claim 14, wherein the data-access module is further programmed to disable access-optimization functionality on the storage device.

17. The system of claim 14, wherein the proximate test location is identical to the control location.

18. The system of claim 14, wherein the proximate test location is distinct from both the control location and the remote test location.

19. The system of claim 14, wherein the control location comprises:
a lowest logical location on the storage device;
a random location on the storage device.

20. A non-transitory computer-readable medium having thereon computer-executable instructions that, when executed by one or more processors of a computing system, cause the computing system to perform a method for determining whether to perform a computing operation that is optimized for a specific storage-device-technology type, the method comprising:
performing at least one proximate read operation, the proximate read operation comprising:
accessing a control location on a storage device;
accessing a test location on the storage device that is logically proximate to the control location;
performing at least one remote read operation, the remote read operation comprising accessing a test location on the storage device that is logically remote from the control location;
determining, by comparing a length of time to access the proximate test location with a length of time to access the remote test location, a technology type of the storage device;
determining, based on the technology type of the storage device, whether to perform the computing operation.

* * * * *